US006933900B2

(12) United States Patent
Kitamori et al.

(10) Patent No.: US 6,933,900 B2
(45) Date of Patent: Aug. 23, 2005

(54) SECTOR ANTENNA APPARATUS AND VEHICLE-MOUNTED TRANSMISSION AND RECEPTION APPARATUS

(75) Inventors: Nobumasa Kitamori, Yokohama (JP); Toshiro Hiratsuka, Machida (JP); Hideyuki Miwa, Shiga-ken (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 15 days.

(21) Appl. No.: 10/693,453

(22) Filed: Oct. 27, 2003

(65) Prior Publication Data

US 2004/0085249 A1 May 6, 2004

(30) Foreign Application Priority Data

Nov. 1, 2002 (JP) ........................................ 2002-320105

(51) Int. Cl.[7] .................................................. H01Q 1/32
(52) U.S. Cl. ........................ 343/713; 343/776; 343/876
(58) Field of Search ................................ 343/711, 713, 343/872, 876, 772, 776

(56) References Cited

U.S. PATENT DOCUMENTS

| 5,111,210 A | | 5/1992 | Morse |
| 5,113,197 A | * | 5/1992 | Luh ............................ 343/776 |
| 5,818,393 A | * | 10/1998 | Fowler et al. ............... 343/705 |
| 2002/0044082 A1 | | 4/2002 | Woodington et al. |
| 2004/0108963 A1 | * | 6/2004 | Clymer et al. ............... 343/837 |

FOREIGN PATENT DOCUMENTS

| DE | 943710 | 6/1956 |
| EP | 0 877 443 A2 | 11/1998 |
| EP | 1 003 241 A1 | 5/2000 |
| EP | 1 251 586 A2 | 10/2002 |
| WO | WO 01/65639 A1 | 9/2001 |

OTHER PUBLICATIONS

Copy of European Search Report dated Feb. 16, 2004.
English abstract of JP 10027299.

* cited by examiner

*Primary Examiner*—Shih-Chao Chen
(74) *Attorney, Agent, or Firm*—Dickstein, Shapiro, Morin & Oshinsky, LLP.

(57) ABSTRACT

A sector antenna apparatus mounted on a vehicle has a casing, in which six horn antennas having apertures over an angular range of 180 degrees and extending radially are accommodated. The proximal ends of the horn antennas are connected to an antenna changeover switch. A portion of the horn antennas which emits beam radiation in the forward and backward direction and diagonal direction of the vehicle have large apertures, and a portion of the horn antennas which emits beam radiation to the right and left of the vehicle have a small aperture. Thus, the required antenna characteristics, such as angular resolution, beam width, antenna gain, are achievable in the required direction.

15 Claims, 9 Drawing Sheets

SECTOR ANTENNA APPARATUS AND VEHICLE-MOUNTED TRANSMISSION AND RECEPTION APPARATUS

BACKGROUND OF THE INVENTION

1. Field of the Invention

The present invention relates to a sector antenna apparatus suitable for use in, for example, wide-angle sensor radar systems, etc., and to a vehicle-mounted transmission and reception apparatus, such as a radar apparatus or a communication apparatus, having the sector antenna apparatus.

2. Description of the Related Art

A first sector antenna apparatus of the related art is disclosed in, for example, Japanese Unexamined Patent Application Publication No. 11-168318 in which a plurality of horn antennas which extend radially are switched by an antenna changeover switch so as to emit beams of high-frequency electromagnetic-wave radiation (radio-frequency signal), such as microwaves or millimeter waves, in, for example, all 360° directions.

A second sector antenna apparatus of the related art is disclosed in, for example, Japanese Unexamined Patent Application Publication No. 9-284045 in which a plurality of element antennas with directivity in different horizontal planes are positioned at different heights so that the central axes of the element antennas are substantially aligned in the vertical direction.

In the second sector antenna apparatus of the related art, some of the element antennas have a different horizontal aperture length so as to cover all directions at a crossover level of −3 dB in adjacent element antennas and at substantially the same gain.

In the first sector antenna apparatus of the related art, the shape of the horn antennas is generally designed so that the horn antennas have the same antenna characteristics, such as beam width and antenna gain. Therefore, the sector antenna apparatus has substantially the same directivity in all directions.

However, a sector antenna apparatus applied to, for example, a vehicle-mounted wide-angle sensor radar apparatus must be able to detect objects, such as obstructions and other vehicles, distant from the vehicle in the forward direction, whereas such a sector antenna apparatus can only detect objects, such as obstructions, near the vehicle in the right and left direction. Therefore, different antenna characteristics may be required depending upon the detection direction.

A sector antenna apparatus having the capability of detecting objects distant therefrom in all directions requires a high angular resolution for distant detection of objects, and requires more horn antennas to support detection in all directions. Thus, the production cost increases, and the size of the overall sector antenna apparatus also increases.

In the related art, patch antennas are mainly used in a vehicle-mounted wide-angle sensor radar system. The patch antennas generally have narrow-bandwidth characteristics, and mass production of patch antennas with necessary antenna characteristics is difficult due to fluctuation of manufacturing imperfections, etc., resulting in low manufacturing yield. Since the directional characteristics of the patch antennas cannot be freely controlled, the patch antennas may not meet the antenna performance required for the radar system.

In the second sector antenna apparatus of the related art having a combination of element antennas with different horizontal aperture lengths, every two element antennas having the same aperture length are paired so that a first antenna pair has a directivity opposite to that of a second antenna pair, and the pairs of element antennas are positioned at different heights in the vertical direction in order to reduce the size of the sector antenna apparatus in the circumferential direction. This cannot achieve different antenna characteristics, such as angular resolution and antenna gain, in the opposite directions, leading to a problem in that the required antenna characteristics are not necessarily achievable in the required direction.

In the second sector antenna apparatus of the related art, the plurality of element antennas are located at different positions in the vertical direction, thus increasing the size of the sector antenna apparatus in the vertical direction. It may therefore be difficult to apply such a sector antenna apparatus to a system whose height is limited.

SUMMARY OF THE INVENTION

In view of the foregoing problems of the related art, it is an object of the present invention to provide a sector antenna apparatus and vehicle-mounted transmission and reception apparatus in which the required antenna characteristics can be achieved in each beam radiation direction.

In an aspect of the present invention, a sector antenna apparatus includes a plurality of horn antennas for radiating beams in different directions; and an antenna changeover switch for changing over the plurality of horn antennas, wherein a horn antenna of the plurality of horn antennas which emits beam radiation in a high-angular-resolution direction of the directions has a large aperture so as to have a narrow beam width, and a horn antenna of the plurality of horn antennas which emits beam radiation in a low-angular-resolution direction of the directions has a small aperture so as to have a broad beam width.

Thus, the horn antenna having a large aperture with a narrow beam width has high angular resolution and high antenna gain, and the detection or communication distance of this horn antenna is long. On the other hand, the horn antenna having a small aperture has low antenna gain and has a short detection distance, although the broad beam width of this horn antenna allows for a wide-angle detection or communication range. Therefore, the required antenna characteristics, such as angular resolution, beam width, and antenna gain, can be achieved in the required direction.

The horn antennas having different aperture areas and different angular resolutions are combined, thus allowing for detection or communication over the entire required angular range using the minimum number of horn antennas. Therefore, the sector antenna apparatus having a small number of horn antennas can be compact. The number of changeovers of the antenna changeover switch is also reduced, and the antenna changeover switch has a simple structure, thus reducing the production cost.

The plurality of horn antennas may be mounted on a vehicle. Preferably, a horn antenna of the plurality of horn antennas which emits beam radiation in the forward direction or backward direction of the vehicle has a large aperture, and a horn antenna of the plurality of horn antennas which emits beam radiation in the right direction or left direction of the vehicle has a small aperture.

The horn antenna having a large aperture is positioned so as to emit beam radiation in the forward and backward direction of the vehicle, and has high antenna gain in the forward and backward direction of the vehicle corresponding to the traveling direction thereof. This horn antenna is therefore able to detect or communicate with objects, such as obstructions and other vehicles, distant from the vehicle. On the other hand, the horn antenna having a small aperture is positioned so as to emit beam radiation in the right/left direction of the vehicle, and can detect only objects, such as obstructions, near the vehicle, although the broad beam width of this horn antenna allows for a wide-angle detection range.

The antenna changeover switch may be a high-frequency changeover switch formed using micromachine technology.

Therefore, the loss of the antenna changeover switch can be reduced, and the isolation among the horn antennas can be improved. Therefore, signal interference between a given horn antenna and an adjacent horn antenna having lower angular resolution can be prevented.

In another aspect of the present invention, a vehicle-mounted transmission and reception apparatus, such as a radar apparatus or a communication apparatus, includes the sector antenna apparatus of the present invention. Therefore, the overall transmission and reception apparatus can be compact, and such a transmission and reception apparatus can easily be mounted on a vehicle or the like having a small installation space for the transmission and reception apparatus.

DESCRIPTION OF THE PREFERRED EMBODIMENTS

A sector antenna apparatus and a vehicle-mounted transmission and reception apparatus according to embodiments of the present invention are described below in detail with reference to the drawings in the context of a vehicle-mounted wide-angle sensor radar apparatus.

FIGS. 1 through 4 show a sector antenna apparatus 1 according to a first embodiment of the present invention. The sector antenna apparatus 1 is mounted on each of the right and left sides of a vehicle A, and includes a casing 2, six horn antennas 5A through 5F, and an antenna changeover switch 6.

Figure 1:
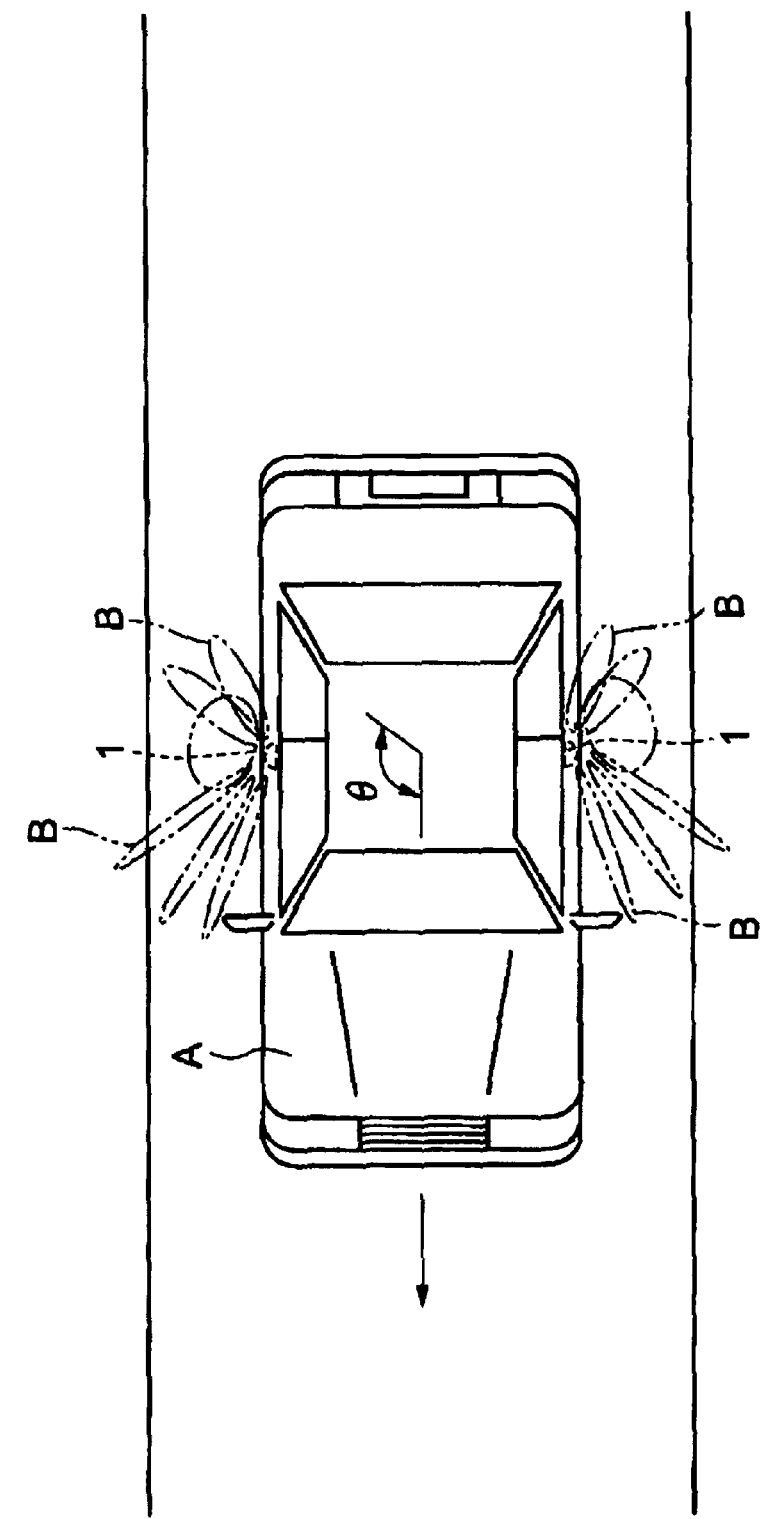
FIG. 1 is a plan view of a sector antenna apparatus according to a first embodiment of the present invention, which is mounted on a vehicle.
Figure 2:
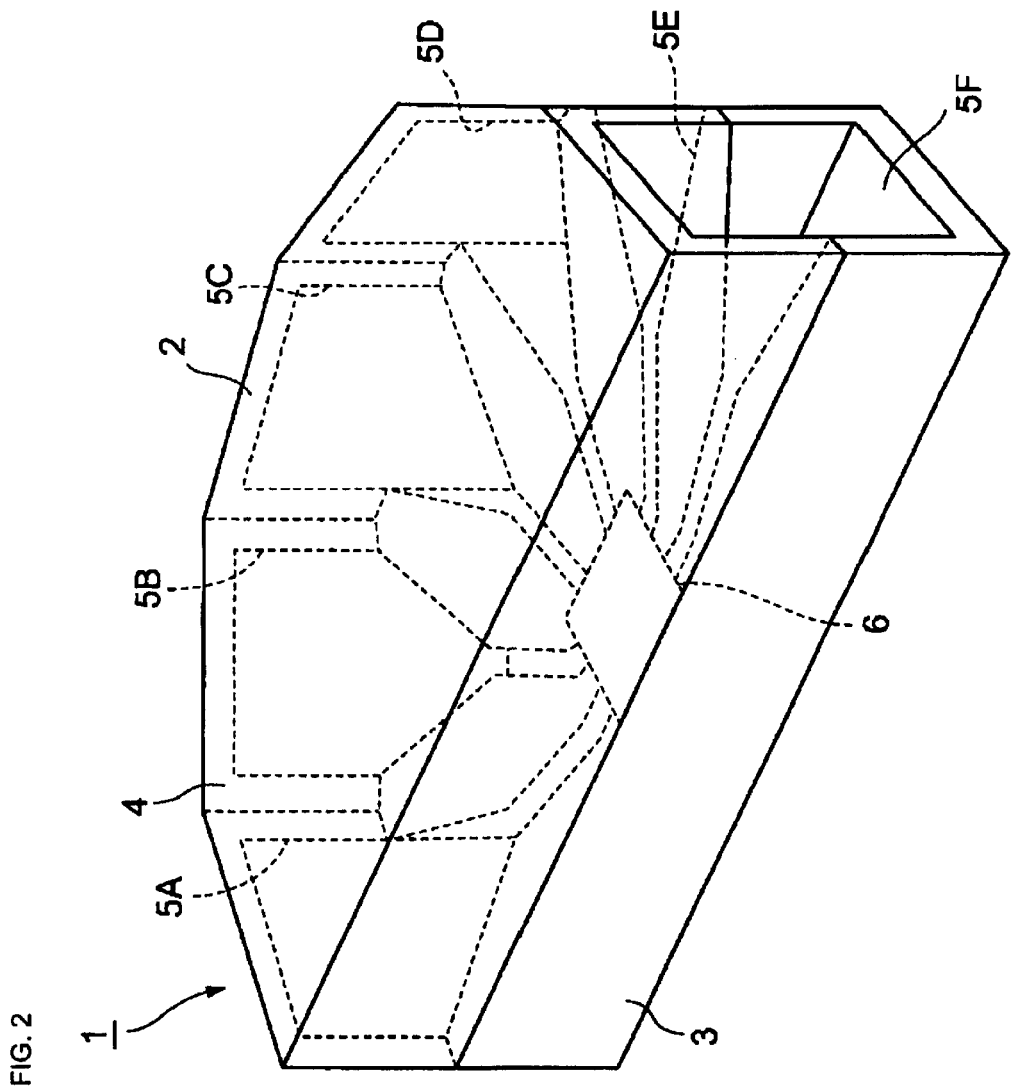
FIG. 2 is a perspective view of the sector antenna apparatus according to the first embodiment.
Figure 3:
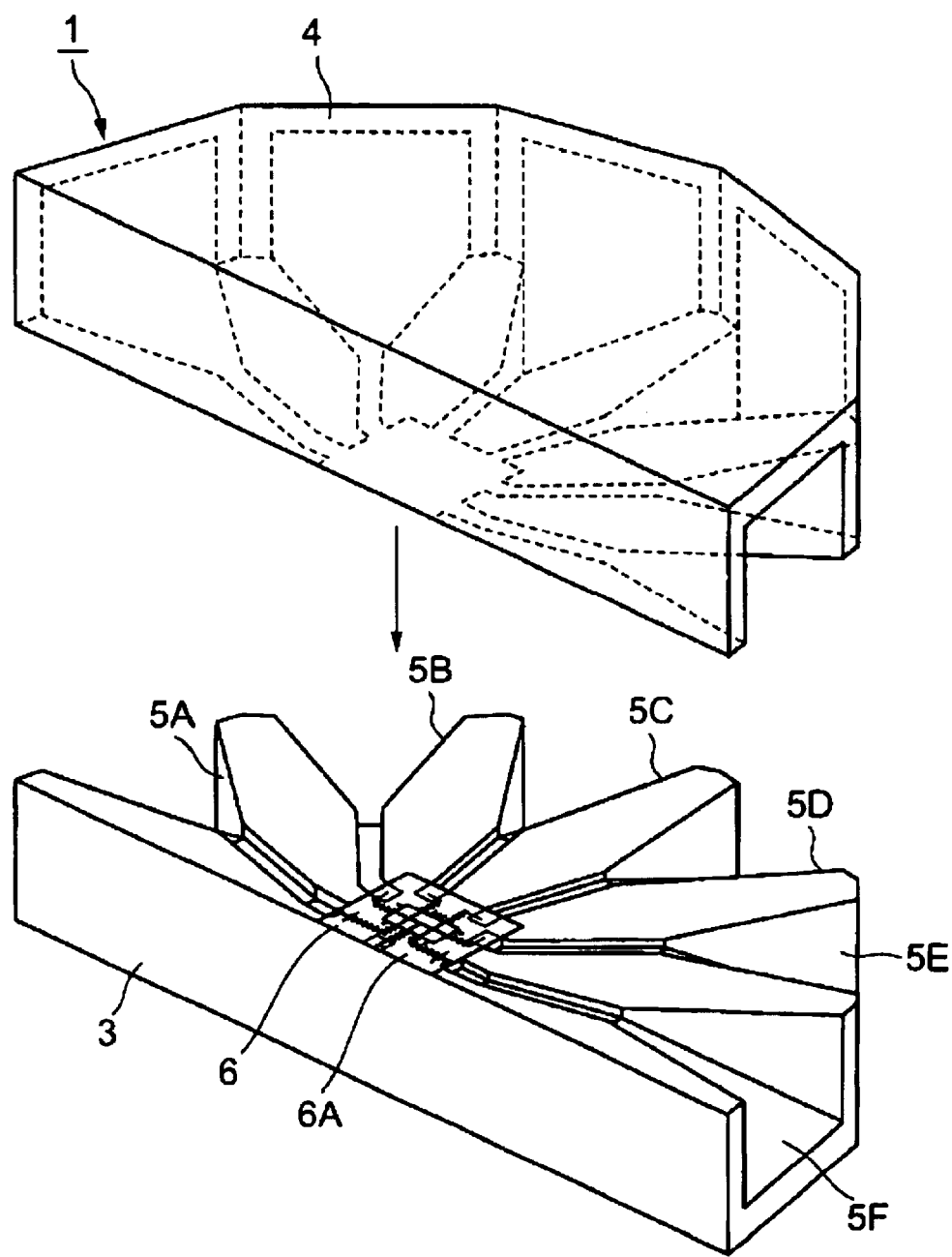
FIG. 3 is an exploded perspective view of the sector antenna apparatus shown in FIG. 2.
Figure 4:
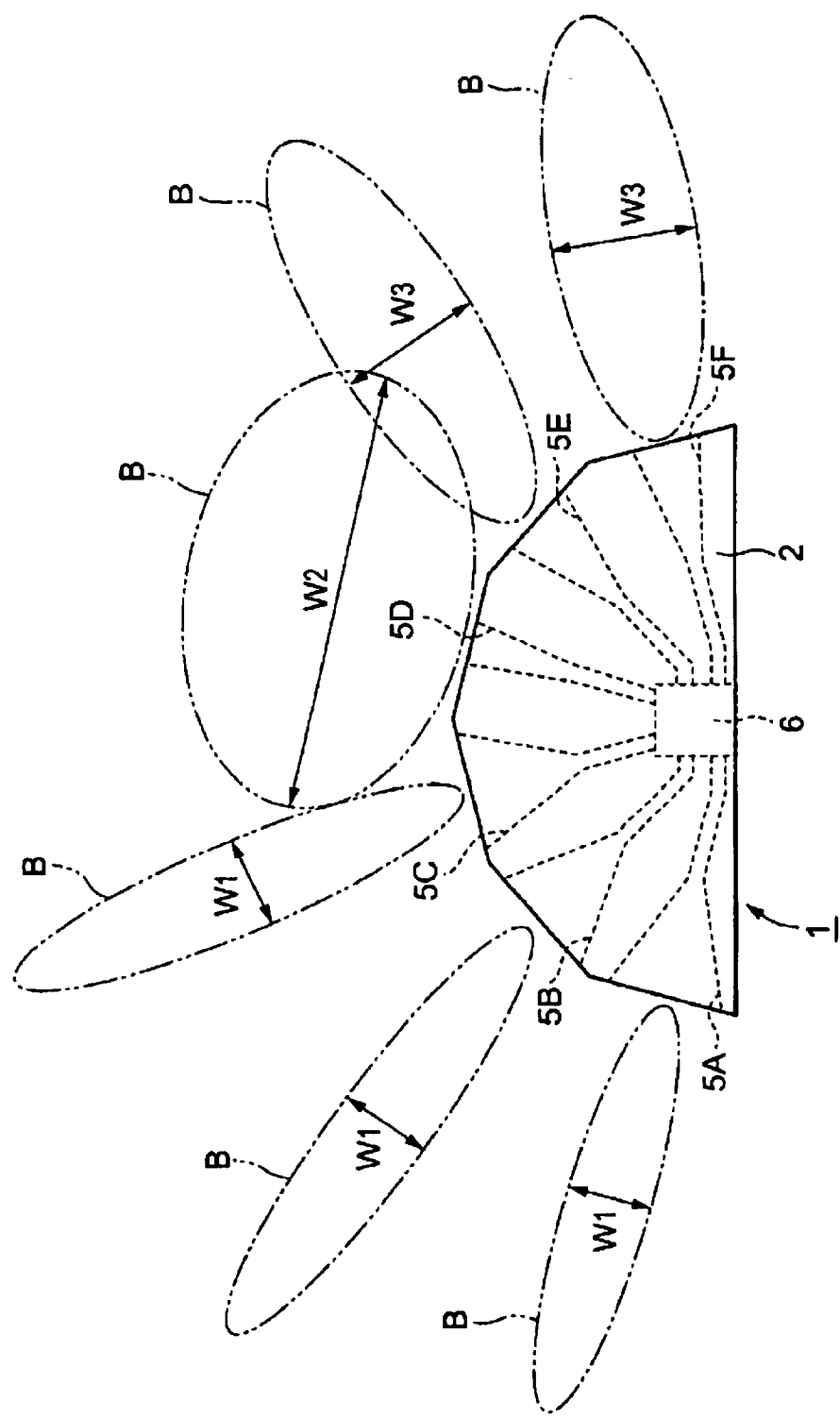
FIG. 4 is a plan view of the sector antenna apparatus according to the first embodiment.

The sector antenna apparatuses 1 mounted on the right and left sides of the vehicle A preferably have a symmetrical structure. In the following description, the sector antenna apparatus 1 mounted on the right side of the vehicle A is used by way of example. In FIG. 1, θ indicates the bearing angle, wherein it is assumed herein that the angle θ is 0° (θ=0°) when it indicates the forward direction of the vehicle A and increments clockwise.

The casing 2 of the sector antenna apparatus 1 is made of conductive metal material, and is shaped into, for example, a substantially semicircular box. The casing 2 is formed of a lower casing 3 in the part lower than the center in the height direction, and an upper casing 4 which is placed on the lower casing 3. The lower casing 3 and the upper casing 4 are semicircular, and the six horn antennas 5A through 5F are arranged between the lower casing 3 and the upper casing 4, which are put together.

The horn antennas 5A through 5F accommodated in the casing 2 preferably are metal rectangular waveguide horn antennas, and radially extend towards the arc end of the casing 2 from the center thereof. The horn antennas 5A through 5F are arranged on substantially the same plane. The proximal end of each of the horn antennas 5A through 5F is positioned in the center of the casing 2 so as to form a waveguide having a rectangular cross-section, and the distal end thereof gradually spreads so as to be open at the arc end of the casing 2.

The proximal ends of the horn antennas 5A through 5F are connected with an oscillator (not shown) via the antenna changeover switch 6, as described below. The horn antennas 5A through 5F have apertures in different directions in a range of, for example, 180° from the forward to backward directions of the vehicle A so that high-frequency signals output from the oscillator are emitted in the different directions.

In the horn antennas 5A through 5F, the horn antennas 5A through 5C having apertures in the forward direction of the vehicle A are able to radiate high-frequency signal beams B to objects ahead of the vehicle A (for example, θ=approximately 0° to 60°), and the aperture areas of the horn antennas 5A through 5C are larger than those of the other horn antennas 5D through 5F. The horn antenna 5D having an aperture in the right or left direction of the vehicle A is able to radiate a high-frequency signal beam B to the side of the vehicle A (for example, θ=approximately 60° to 120°), and the aperture area of the horn antenna 5D is smaller than the aperture areas of the other horn antennas 5A through 5C, 5E, and 5F. The horn antennas 5E and 5F having apertures in the backward direction of the vehicle A are able to radiate high-frequency signal beams B to objects behind the vehicle A (for example, θ=approximately 120° to 180°), and the aperture areas of the horn antennas 5E and 5F are smaller than those of the horn antennas 5A through 5C, and are larger than that of the horn antenna 5D.

Thus, the horn antennas 5A through 5C emit high-frequency signal radiation with a narrow beam width W1 to objects ahead of the vehicle A, and the horn antenna 5D having an aperture in the side direction emits high-frequency signal radiation with a broad beam width W2 to the right or left of the vehicle A. The horn antennas 5E and 5F emit high-frequency signal radiation with a beam width W3 broader than the beam width W1 and narrower than the beam width W2 to objects behind the vehicle A.

The antenna changeover switch 6 located in the center of the casing 2 is formed using micromachine technology including highly accurate etching on a semiconductor substrate 6A, such as a silicon substrate, and is formed of a high-frequency signal changeover switch (i.e., RF-MEMS (radio-frequency microelectromechanical system)) formed of a monolithic microwave integrated circuit (MMIC) device or the like. The antenna changeover switch 6 is connected with the proximal ends of the horn antennas 5A through 5C by converting transmission lines, such as microstrip lines, coplanar guides, and slot lines, formed on the substrate 6A into waveguides.

The antenna changeover switch 6 is held between the lower casing 3 and the upper casing 4, and is positioned at the intermediate portion in the height direction of the casing 2. The antenna changeover switch 6 connected to the proximal ends of the radially arranged horn antennas 5A through 5F is an SP6T (Single-Pole Six-Throw) switch for the six horn antennas 5A through 5F, and is connected between an external oscillator (not shown) or the like and the six horn antennas 5A through 5F so as to selectively connect the horn antennas 5A through 5F to the oscillator.

The antenna changeover switch 6 is not limited to an SP6T switch, and may be an SPnT switch depending upon the number of horn antennas, where n is two or more.

The vehicle A may also be equipped with an ACC (Adaptive Cruise Control) antenna (not shown), in addition to the sector antenna apparatus 1, to detect objects, such as obstructions, ahead of the vehicle A (for example, $\theta=-30°$ to $+30°$) using the ACC antenna.

In the sector antenna apparatus 1 of the first embodiment, the antenna changeover switch 6 is connected to an oscillator or the like so as to sequentially change over the horn antennas 5A through 5F to connect to the oscillator. Thus, the horn antennas 5A through 5F sequentially emit radiation of high-frequency signals output from the oscillator to objects ahead of the vehicle A to objects behind the vehicle A, and receive reflection waves of the high-frequency signal radiation reflected by an obstruction, such as a different vehicle. The phase difference between the reflection waves and transmission waves formed of the high-frequency signals output from the oscillator is detected, thereby determining the distance between the vehicle A and the obstruction.

In the first embodiment, therefore, the aperture areas of the horn antennas 5A through 5F differ from each other. The horn antennas 5A through 5C having large apertures with the narrow beam width W1 have high angular resolution and high antenna gain, and the detection or communication distance of the horn antennas 5A through 5C is long. On the other hand, the horn antenna 5D having a small aperture has low antenna gain and has a short detection distance, although the horn antenna 5D with the broad beam width W2 has a wide-angle detection or communication range.

Generally, a wide-angle sensor radar apparatus mounted on the vehicle A, such as an automobile, must have functions of detecting vehicles squeezing through in the forward direction of the vehicle A (for example, $\theta=0°\pm60°$), detecting vehicles behind the vehicle A in the backward direction (for example, $\theta=180°\pm60°$) when the vehicle A is to change lanes, and sensing collision of a vehicle behind the vehicle A in the backward direction (for example, $\theta=180°\pm30°$). The forward and backward direction of the vehicle A corresponds to the traveling direction of the vehicle A or other vehicles, and the radar apparatus must be able to detect objects distant from the vehicle A in this direction. In the right and left direction of the vehicle A (for example, $\theta=90°\pm30°$ and $\theta=-90°\pm30°$), however, the radar apparatus can only detect objects near the vehicle A because objects, such as other vehicles, rarely approach the vehicle A in this direction when the vehicle A is traveling.

In the first embodiment, the horn antennas 5A through 5C, 5E, and 5F capable of emitting radiation of the beams B in the forward and backward direction of the vehicle A have large apertures with the narrow beam widths W1 and W3 and have high antenna gain in the forward and backward direction of the vehicle A corresponding to the traveling direction thereof. The horn antennas 5A through 5C, 5E, and 5F are therefore able to detect or communicate with objects, such as obstructions and other vehicles, distant from the vehicle A. On the other hand, the horn antenna 5D capable of emitting radiation of the beam B in the right/left direction of the vehicle A has a small aperture, and can detect only objects, such as obstructions, near the vehicle A, whereas the horn antenna 5D with the broad beam width W2 has a wide-angle detection range. Consequently, the required antenna characteristics, such as angular resolution, beam width, and antenna gain, can be achieved in the required direction.

The horn antennas 5A through 5F having different aperture areas and different angular resolutions are combined, thus allowing for detection of objects, such as other vehicles, in the whole required angular range (in this embodiment, 180°) using the minimum number of horn antennas 5A through 5F. Therefore, the number of horn antennas 5A through 5F is smaller than the number of horn antennas with high angular resolution which are required in, for example, a sector antenna apparatus for detection over the entire required angular range, and the sector antenna apparatus 1 is thus more compact. Since the number of horn antennas 5A through 5F is reduced, the number of changeovers of the antenna changeover switch 6 is also reduced, and the antenna changeover switch 6 has a simple structure, thus reducing the production cost.

In the first embodiment, the sector antenna apparatus 1 formed of the plurality of horn antennas 5A through 5F forms a vehicle-mounted wide-angle sensor radar apparatus. Unlike, for example, patch antennas having narrow-bandwidth characteristics, due to the wide-bandwidth characteristics of the horn antennas 5A through 5F, fluctuation of manufacturing imperfections, etc., is allowable, thus improving the productivity. The directions of the apertures of the horn antennas 5A through 5F can be defined as desired, thereby readily improving the directional characteristics of the sector antenna apparatus 1, which reliably meets the antenna performance requirements for the radar system.

The antenna changeover switch 6 is a high-frequency changeover switch integrated on a single substrate using micromachine technology, thus preventing leakage of high-frequency signals from connection parts or the like, or preventing external noise from entering, compared to a changeover switch formed by combining a plurality of parts, thus reducing the loss of the antenna changeover switch 6 while increasing the isolation among the horn antennas 5A through 5F.

For example, when the horn antenna 5D with the broad beam width W2 is used for detection, the antenna changeover switch 6 can connect only the horn antenna 5D to an external detection circuit or the like even if high-frequency signal radiation emitted from the horn antenna 5D or the reflection wave thereof is prone to enter the adjacent horn antenna 5C or 5E. Therefore, signal contamination or interference from the horn antenna 5C or 5E can be prevented, leading to high sensitivity of the sector antenna apparatus 1.

In the first embodiment, the horn antennas 5A through 5F radiate the beams B over a range of angles of, for example, 0° to 60° in the forward direction of the vehicle A, 60° to 120° in the side direction thereof, and 120° to 180° in the backward direction thereof. However, the present invention is not limited to these angles, and the angles in the forward direction, side direction (right/left direction), and backward direction of the vehicle A may be defined, as appropriate, depending upon the specification, etc., of the vehicle A.

Figure 5:
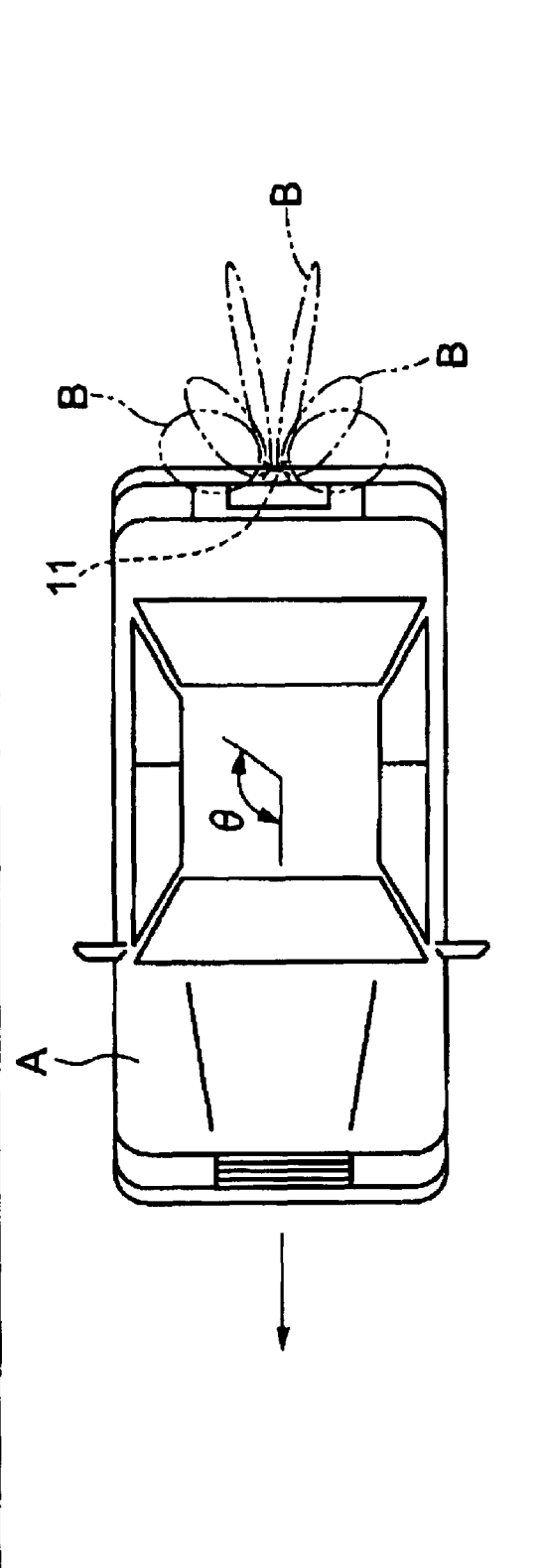
FIG. 5 is a plan view of a sector antenna apparatus according to a second embodiment of the present invention, which is mounted on a vehicle.
Figure 6:
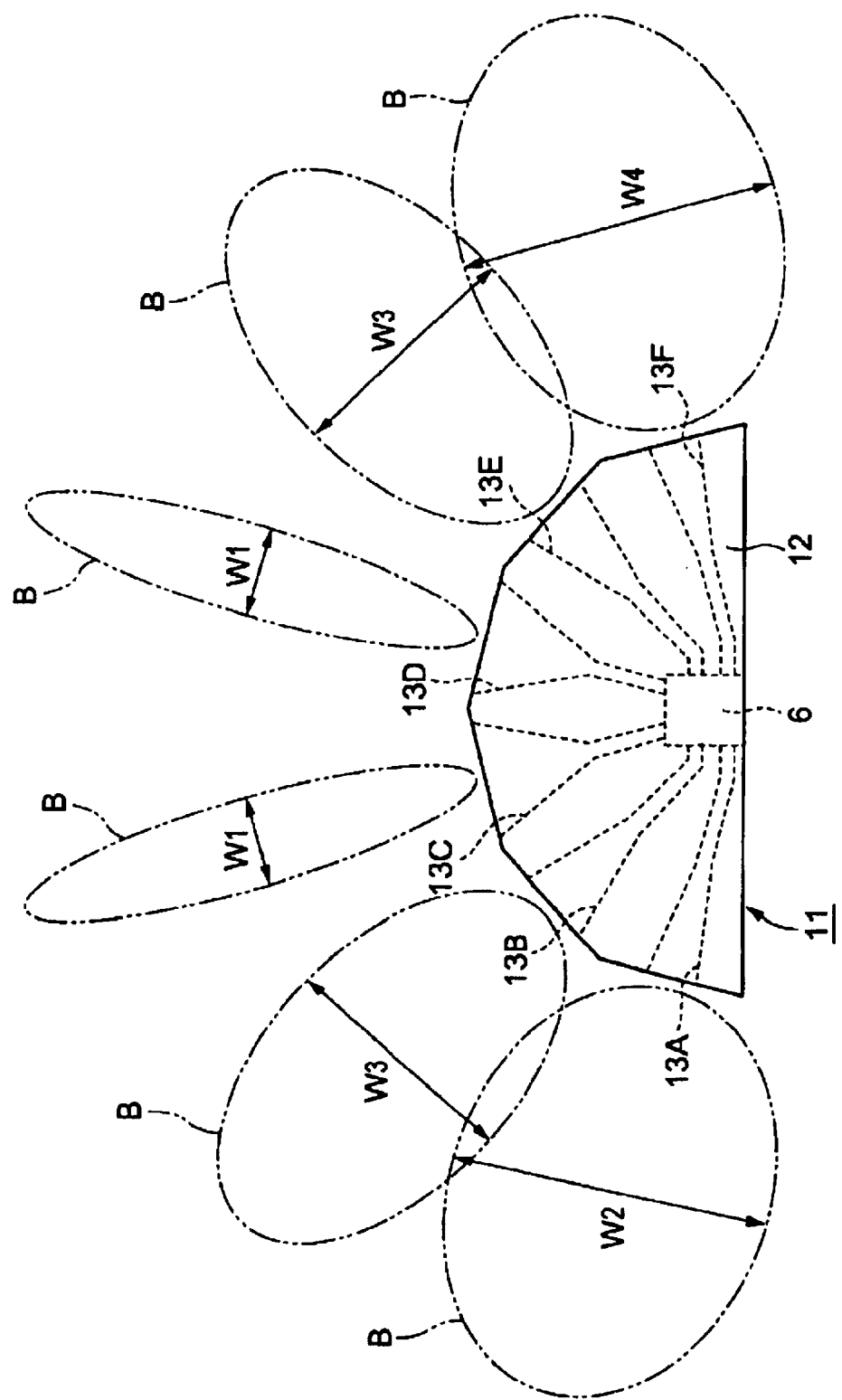
FIG. 6 is a plan view of the sector antenna apparatus according to the second embodiment.

FIGS. 5 and 6 show a sector antenna apparatus 11 according to a second embodiment of the present invention. In the second embodiment, the vehicle A is equipped with the sector antenna apparatus 11 at the rear side thereof. In the second embodiment, the same components as those of the first embodiment are assigned the same reference numerals, and a description thereof is omitted.

The sector antenna apparatus 11 mounted on the rear of the vehicle A includes a casing 12, horn antennas 13A through 13F, and an antenna changeover switch 6.

Like the casing 2 in the first embodiment, the casing 12 of the sector antenna apparatus 11 is preferably made of conductive metal material, and is shaped into, for example, a substantially semicircular box. The casing 12 accommodates the six horn antennas 13A through 13F.

Like the horn antennas 5A through 5F in the first embodiment, the horn antennas 13A through 13F accommodated in the casing 12 are metal rectangular waveguide horn antennas, and radially extend towards the arc end of the casing 12 from the center thereof.

The horn antennas 13A through 13F are arranged on substantially the same plane. The proximal end of each of the horn antennas 13A through 13F is positioned in the center of the casing 12 so as to form a waveguide having a rectangular cross-section, and is connected with the antenna changeover switch 6. The distal end of each of the horn antennas 13A through 13F gradually spreads so as to be open at the arc end of the casing 12. The horn antennas 13A through 13F have apertures in different directions in a range of, for example, 180° from the right to left with respect to the traveling direction of the vehicle A so that high-frequency signals supplied via the antenna changeover switch 6 are emitted in the different directions.

In the horn antennas 13A through 13F, the horn antennas 13C and 13D having apertures in the backward direction of the vehicle A are able to radiate high-frequency signal beams B to objects behind the vehicle A (for example, $\theta$=approximately 150° to 210°), and the aperture areas of the horn antennas 13C and 13D are larger than those of the other horn antennas 13A, 13B, 13E, and 13F. The horn antennas 13A and 13F having apertures in the left and right of the vehicle A are able to radiate high-frequency signal beams B to the left and right of the vehicle A (for example, $\theta$=approximately 90° to 120° and $\theta$=approximately 240° to 270°), respectively, and the aperture areas of the horn antennas 13A and 13F are smaller than those of the other horn antennas 13B through 13E. The horn antenna 13B between the horn antennas 13A and 13C, and the horn antenna 13E between the horn antennas 13F and 13D are able to radiate high-frequency signal beams B to objects behind the vehicle A (for example, $\theta$=120° to 150° and 210° to 240°), and the aperture areas of the horn antennas 13B and 13E are smaller than those of the horn antennas 13C and 13D and are larger than those of the horn antennas 13A and 13F.

Thus, the horn antennas 13C and 13D emit high-frequency signal radiation with a narrow beam width W1 to objects behind the vehicle A, and the horn antennas 13A and 13F having apertures in the left and right of the vehicle A emit high-frequency signal radiation with a broad beam width W2 to the left and right of the vehicle A, respectively. The horn antennas 13B and 13E emit high-frequency signal radiation with a beam width W3 broader than the beam width W1 and narrower than the beam width W2 to objects behind the vehicle A.

Therefore, the second embodiment can also achieve similar advantages to those of the first embodiment.

In the second embodiment, the horn antennas 13A through 13F radiate the beams B over a range of angles of, for example, 120° to 240° in the backward direction of the vehicle A and 90° to 120° and 240° to 270° in the side direction thereof. However, the present invention is not limited to these angles, and the angles in the backward direction and side direction (right/left direction) of the vehicle A may be defined, as appropriate, depending upon the specification, etc., of the vehicle A.

Figure 7:
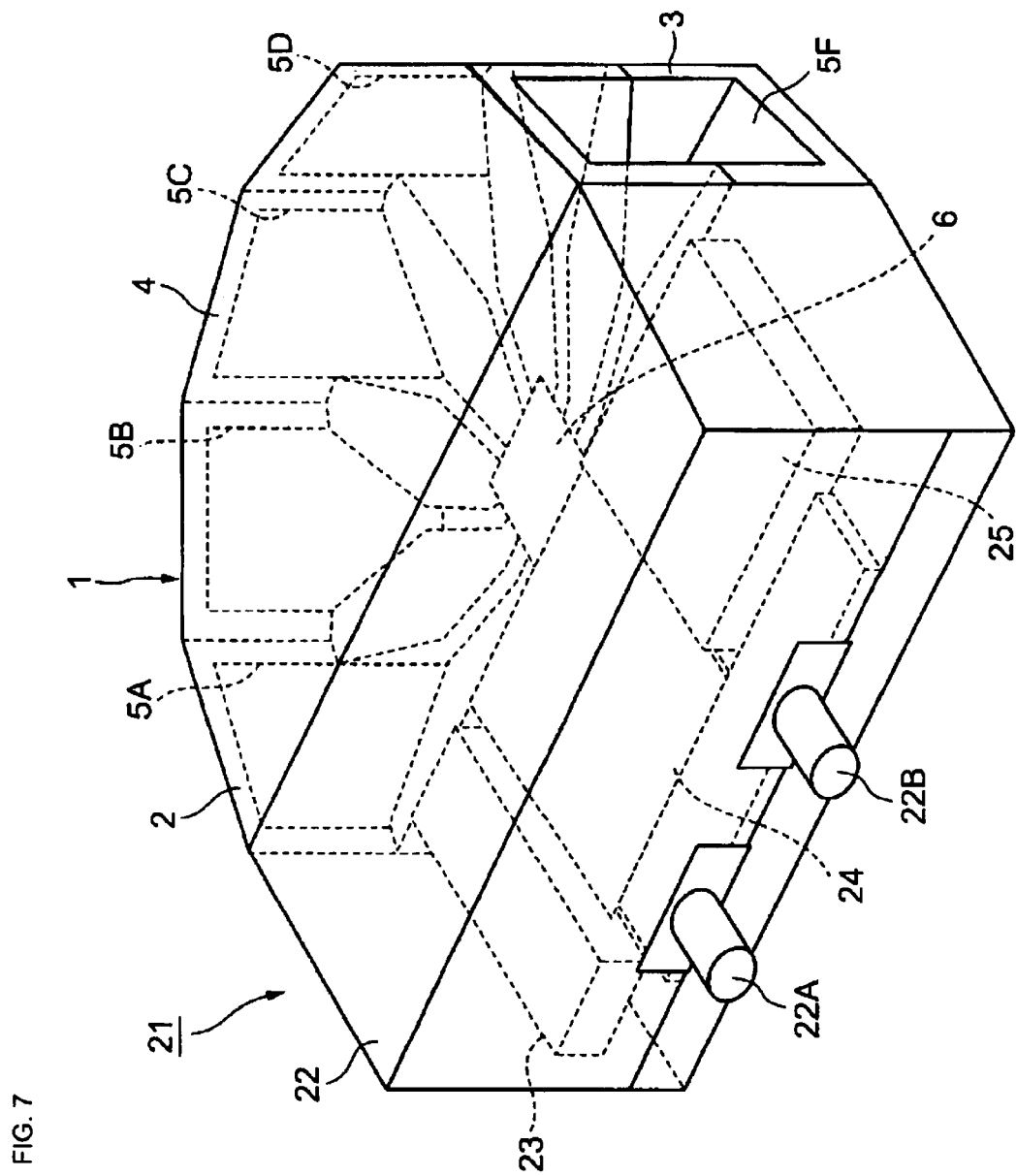
FIG. 7 is a perspective view of a wide-angle sensor radar apparatus according to a third embodiment of the present invention.
Figure 8:
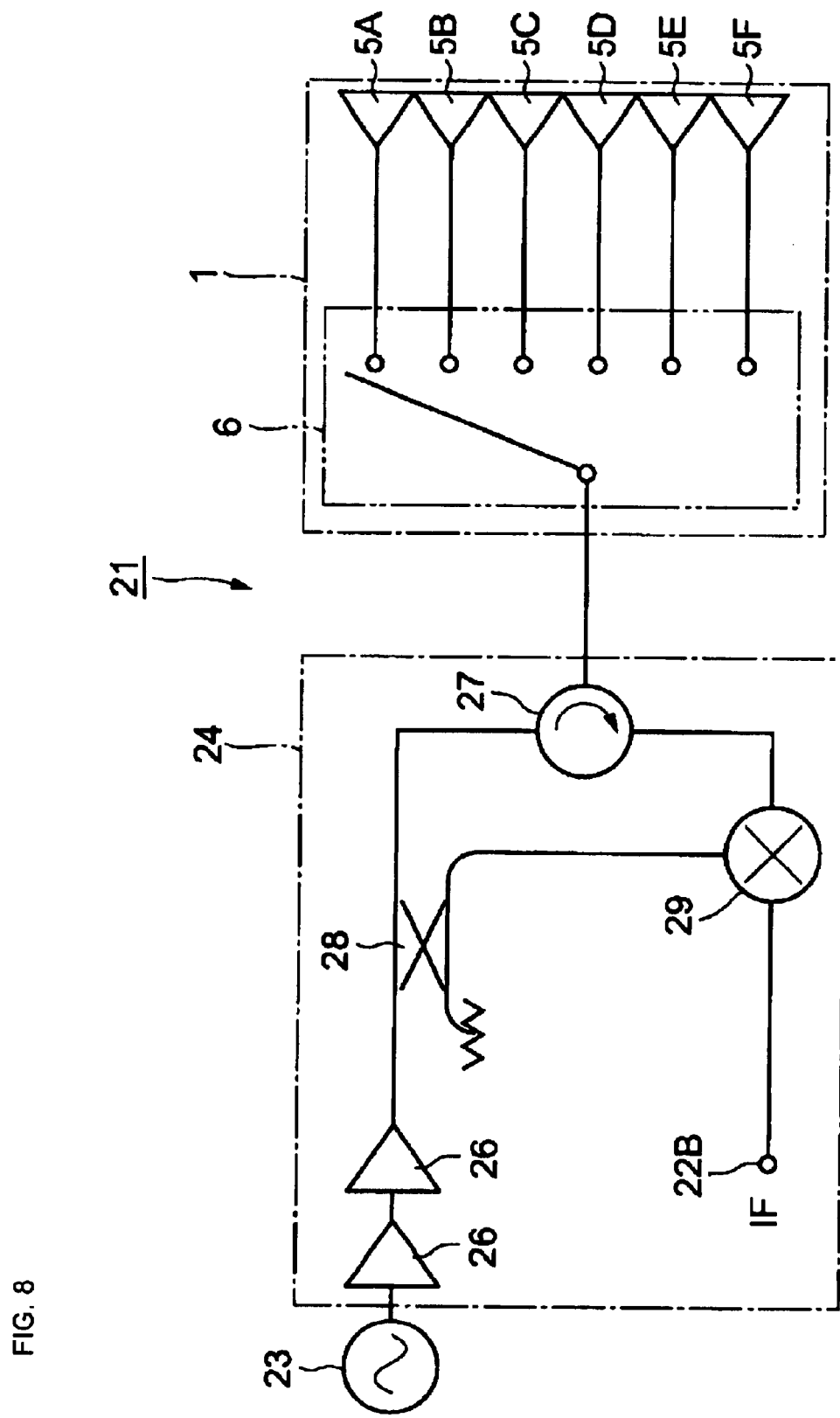
FIG. 8 is a block diagram of the wide-angle sensor radar apparatus according to the third embodiment.

FIGS. 7 and 8 show a vehicle-mounted wide-angle sensor radar apparatus 21 according to a third embodiment of the present invention. In the third embodiment, the sector antenna apparatus of the present invention is integrated into a vehicle-mounted wide-angle sensor radar apparatus serving as a transmission and reception apparatus. In the third embodiment, the same components as those of the first embodiment are assigned the same reference numerals, and a description thereof is omitted.

The radar apparatus 21 includes the sector antenna apparatus 1, a voltage-controlled oscillator 23, a high-frequency sub-module 24, and so on.

A circuit casing 22 is attached to the casing 2 so as to be adjacent to the antenna changeover switch 6 of the sector antenna apparatus 1, and accommodates the voltage-controlled oscillator 23, the high-frequency sub-module 24, and a power supply circuit 25 for supplying a power voltage to drive the voltage-controlled oscillator 23, etc. The circuit casing 22 has a control-voltage terminal 22A for supplying a control voltage to the voltage-controlled oscillator 23, etc., and an output terminal 22B for outputting the signal output from a mixer 29 described below to an external device.

The voltage-controlled oscillator 23 is accommodated in the circuit casing 22, and is connected with the antenna changeover switch 6 via the high-frequency sub-module 24. The voltage-controlled oscillator 23 outputs a signal of a frequency in accordance with the control voltage input from the control-voltage terminal 22A, and supplies a high-frequency signal to a horn antenna of the horn antennas 5A through 5F to which it is connected via the antenna changeover switch 6.

The high-frequency sub-module 24 connected between the voltage-controlled oscillator 23 and the antenna changeover switch 6 includes at least one amplifier 26, a circulator 27, a branch coupler 28, and the mixer 29. The amplifier 26 and the circulator 27 are connected between the voltage-controlled oscillator 23 and the antenna changeover switch 6 to amplify the high-frequency signal output from the voltage-controlled oscillator 23 to supply the amplified signal to the antenna changeover switch 6.

The branch coupler 28 is connected between the amplifier 26 and the circulator 27 to branch the high-frequency signal amplified by the amplifier 26 to the mixer 29. The mixer 29 is connected with the antenna changeover switch 6 via the circulator 27, and is also connected with the branch coupler 28. The mixer 29 down-converts a signal received by the horn antennas 5A through 5F into an intermediate-frequency signal IF using the high-frequency signal from the voltage-controlled oscillator 23.

In the wide-angle sensor radar apparatus of the third embodiment, the high-frequency signal output from the voltage-controlled oscillator 23 is amplified by the amplifier 26, and the resulting signal is sent via the circulator 27 from any of the horn antennas 5A through 5F selected by the antenna changeover switch 6 as a transmission signal. A signal received by the horn antennas 5A through 5F is input to the mixer 29 via the circulator 27, and is down-converted using the high-frequency signal branched by the branch coupler 28 into an intermediate-frequency signal IF, which is then output.

According to the third embodiment, therefore, the wide-angle sensor radar apparatus 21 formed of the sector antenna apparatus 1 can be compact.

In the third embodiment, the sector antenna apparatus 1 of the first embodiment is applied to the radar apparatus 21; however, the sector antenna apparatus 11 of the second embodiment may be applied to the radar apparatus 21.

In the third embodiment, the sector antenna apparatus 1 is used to form the radar apparatus 21 serving as a transmission and reception apparatus. The sector antenna apparatus 1 or 11 of the present invention may also be applied to, for example, a communication apparatus serving as a transmission and reception apparatus.

Figure 9:
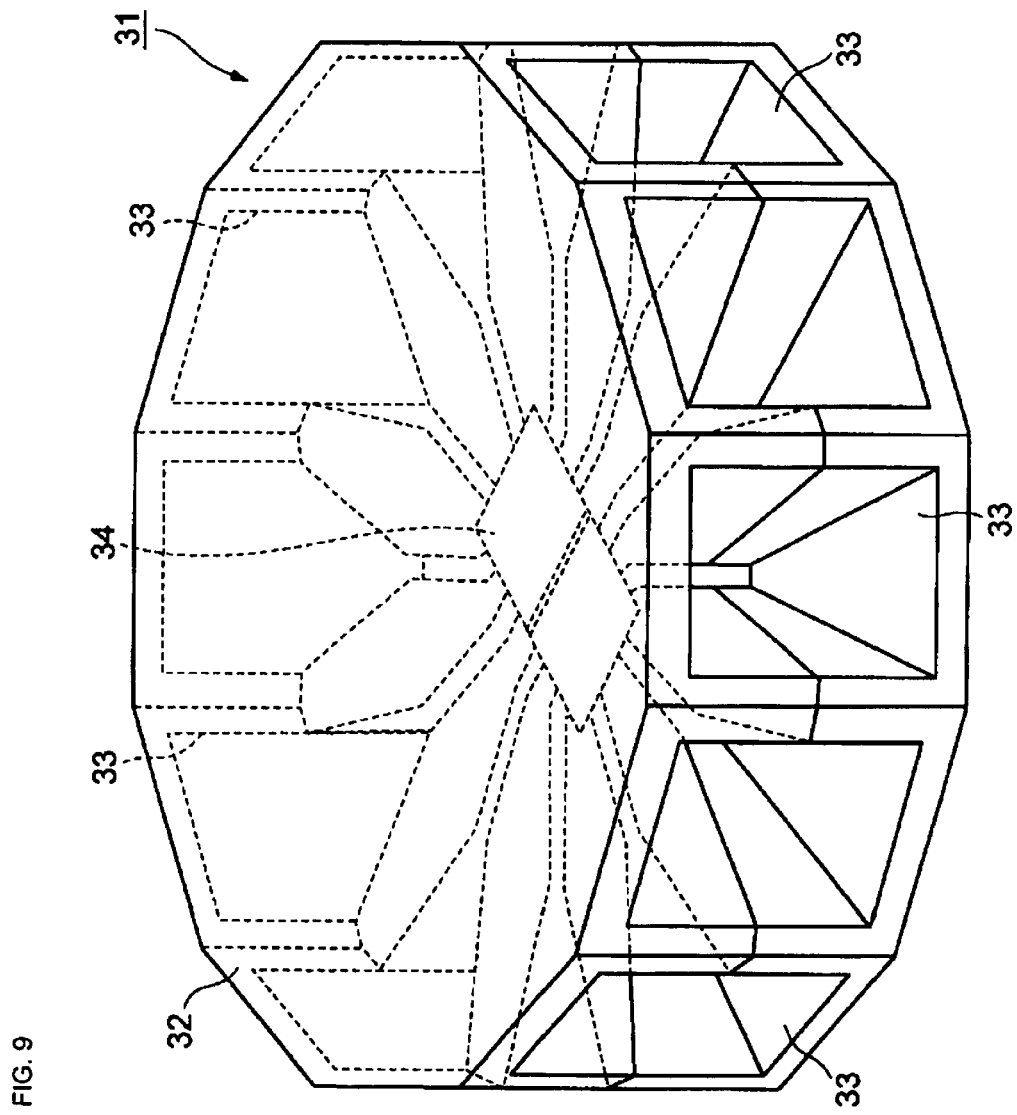
FIG. 9 is a perspective view of a sector antenna apparatus according to a modification of the present invention.

In the foregoing embodiments, the sector antenna apparatus 1 or 11 having a substantially semicircular shape is configured such that the six horn antennas 5A through 5F or 13A through 13F are arranged over an angular range of 180°. However, the present invention is not limited to this configuration. As one modification of the present invention shown in FIG. 9, for example, a sector antenna apparatus 31 having a substantially circular casing 32 may be used, in which 12 horn antennas 33 which cover all 360° directions are accommodated in the casing 32, and the aperture areas of the horn antennas 33 differ from each other depending upon the required angular resolution, etc.

In this modification, a flat antenna changeover switch 34 is located at the proximal ends of the 12 horn antennas 33 which extend radially, and a high-frequency circuit (not shown) including a voltage-controlled oscillator and so on are placed on the backside of the antenna changeover switch 34. The antenna changeover switch 34 is connected between the high-frequency circuit and the horn antennas 33 for selective connection therebetween.

The sector antenna apparatus of the present invention is not necessarily semicircular or circular, but may be fan-shaped, polygonal, elliptical, or the like.

While the rectangular waveguide horn antennas 5A through 5F or 13A through 13F are used in the foregoing embodiments, the present invention is not limited thereto, and ridge horn antennas, multi-mode horn antennas, or corrugated horn antennas may be used.

In the foregoing embodiments, the sector antenna apparatus 1 or 11 of the present invention is applied to a vehicle-mounted transmission and reception apparatus; however, the present invention is not limited thereto. The sector antenna apparatus 1 or 11 may be applied to any transmission and reception apparatus having different antenna characteristics, such as angular resolution and antenna gain, in each direction, for example, a transmission and reception apparatus for use in a wireless LAN, etc.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sector antenna apparatus comprising:
   a plurality of horn antennas for radiating beams in different directions; and
   an antenna changeover switch for switching between the plurality of horn antennas,
   wherein at least a first horn antenna of the plurality of horn antennas emits beam radiation in a high-angular-resolution direction of the different directions and has a large aperture providing a narrow beam width, and at least a second horn antenna of the plurality of horn antennas emits beam radiation in a low-angular-resolution direction of the different directions and has a small aperture providing a broad beam width.

2. The sector antenna apparatus according to claim 1, wherein the plurality of horn antennas are mounted on a vehicle.

3. The sector antenna apparatus according to claim 2, wherein the horn antenna of the plurality of horn antennas having the large aperture emits beam radiation in one of a forward direction and a backward direction of the vehicle.

4. The sector antenna apparatus according to claim 2, wherein the horn antenna of the plurality of horn antennas having the small aperture emits beam radiation in one of a right-side direction and a left-side direction of the vehicle.

5. The sector antenna apparatus according to claim 1, wherein the antenna changeover switch is a micromachine high-frequency changeover switch.

6. The sector antenna apparatus according to claim 1, wherein the plurality of horn antennas are arranged symmetrically.

7. The sector antenna apparatus according to claim 1, wherein the plurality of horn antennas are arranged in a casing.

8. The sector antenna apparatus according to claim 7, wherein the casing is formed of a conductive metal material.

9. The sector antenna apparatus according to claim 1, wherein the plurality of horn antennas are arranged in the same plane.

10. The sector antenna apparatus according to claim 1, wherein the changeover switch sequentially switches between the plurality of horn antennas.

11. The sector antenna apparatus according to claim 1, wherein the sector antenna apparatus is arranged so as to emit beam radiation from the rear of a vehicle.

12. A sector antenna apparatus comprising:
   a plurality of horn antennas for radiating beams in different directions;
   an antenna changeover switch for switching between the plurality of horn antennas;
   a voltage-controlled oscillator;
   a high-frequency sub-module connected to the voltage-controlled oscillator and the antenna changeover switch; and
   a control-voltage terminal connected to the voltage controlled oscillator,
   wherein at least a first horn antenna of the plurality of horn antennas emits beam radiation in a high-angular-resolution direction of the different directions and has a large aperture providing a narrow beam width, and at least a second horn antenna of the plurality of horn antennas emits beam radiation in a low-angular-resolution direction of the different directions and has a small aperture providing a broad beam width.

13. The sector antenna apparatus according to claim 12, wherein the high-frequency sub-module includes at least one amplifier and a circulator connected betweem the voltage-controlled oscillator and the antenna changeover switch.

14. The sector antenna apparatus according to claim 13, wherein the high-frequency sub-module further includes a branch coupler connected between the at least one amplifier and the circular; and a mixer connected with the antenna changeover switch via the circular and also connected with the branch coupler.

15. A vehicle-mounted transmission and reception apparatus comprising:
  a sector antenna apparatus which includes:
    a plurality of horn antennas for radiating beams in different directions; and
    an antenna changeover switch for switching between the plurality of horn antennas,
  wherein at least a first horn antenna of the plurality of horn antennas emits beam radiation in a high-angular-resolution direction of the different directions and has a large aperture providing a narrow beam width, and at least a second horn antenna of the plurality of horn antennas emits beam radiation in a low-angular-resolution direction of the different directions and has a small aperture providing a broad beam width.

* * * * *